July 3, 1923.
G. PARK
1,460,560
FEEDER FOR KERNEL BLANCHING MACHINES
Filed Dec. 23, 1921
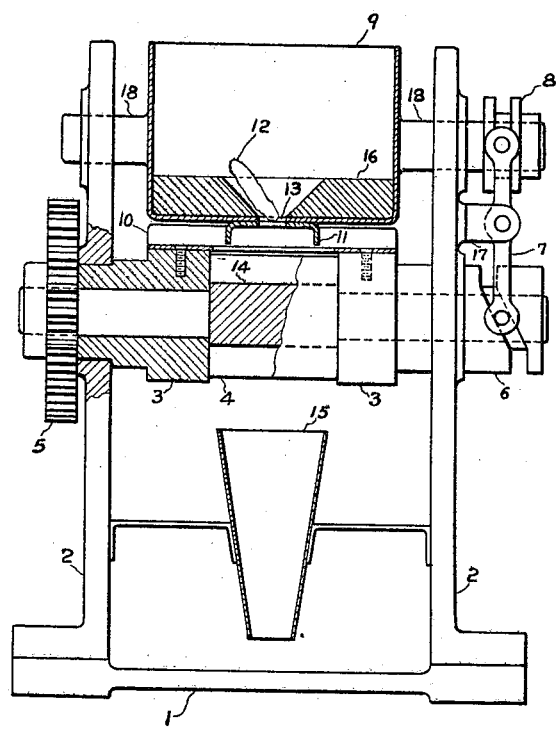
INVENTOR
GEORGE PARK.
BY
*G. Park.*
ATTORNEY Patented July 3, 1923.

1,460,560

UNITED STATES PATENT OFFICE.

GEORGE PARK, OF BAYONNE, NEW JERSEY.

FEEDER FOR KERNEL-BLANCHING MACHINES.

Application filed December 23, 1921. Serial No. 524,548.

*To all whom it may concern:*

Be it known that I, GEORGE PARK, a citizen of the United States, resident at Bayonne, in the county of Hudson and State of New Jersey, have invented a new and useful Feeder for Kernel-Blanching Machines.

My invention relates to improvements in which a vibrated feeder containing the kernels to be operated on has a hole in the bottom, and a filling block fitted inside having a corresponding conical aperture, while on the underside of the feeder an escapement is secured for regulating the flow of kernels.

A bridge spans the chasm directly below the hole, forming a trough into which the kernel falls and is aligned, the hole and escapement being of such size and construction as to permit only one kernel at a time entering upon the bridge through the hole.

A distributer, cylindrical in form and having longitudinal slots, rotates below the bridge, forming a false or moving platform upon which the kernel rests. The kernel, falling through the bridge into a slot as it opens on to the bridge by the rotating of the distributer, is carried round and dumped into the funnel for its distribution to another part of the machine already claimed and patented.

I attain these objects by mechanism illustrated in the accompanying drawing, in which The figure is a vertical section of the feeder.

The base 1 and the side brackets 2 secured to the base 1 form the frame of the feeder.

In the bearings 3 the distributer 4 driven by the gear 5 rotates.

On the other end of the distributer 4 the cam 6 is secured and connected by the lever 7, pivoted to the eyebolt 17, to the spool 8 on the end of the feeder bar 18.

On the inside of the feeder 9 the filling block 16 rests, and on the underside of the feeder 9 the escapement 11 are secured members.

The kernel 12 is seen resting in the conical aperture of the filling block 16, ready to enter the hole 13 and finally to come to rest on the bridge 10 and the distributer 4, until the slot 14 in the distributer 4 opens on to the bridge 10 by rotating.

The kernel 12 then falls into the slot 14 and is carried round by the distributer 4 and dumped into the funnel 15, thus completing the process of separating and distributing.

What is claimed is:—

In a feeder for a blanching machine, the combination with a vibrating feeder having a hole therethrough, a filling block resting therein having a conical aperture therethrough, an escapement secured thereunder having a hole therethrough and members subtending therefrom for the controlling and regulating of the kernels, of a rotating cylindrical distributer having slots thereon, a bridge, having a slot therethrough and sides thereon, interposed between said vibrating feeder and said rotating cylindrical distributer for the reception of kernels passing from the one to the other.

April 1st, 1920.

GEORGE PARK.

Witnesses:
 LOUIS CARDANEO,
 ALBERT STRANCH.